Jan. 17, 1967 R. L. BLEICHER 3,298,085
METHOD OF FORMING BUSHINGS
Original Filed Dec. 21, 1961
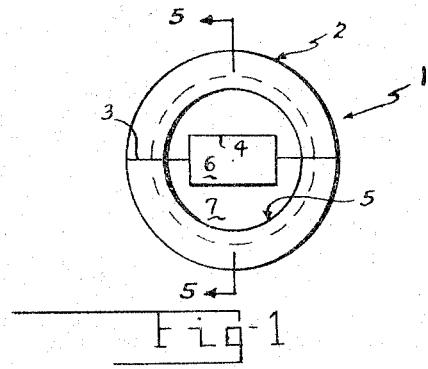
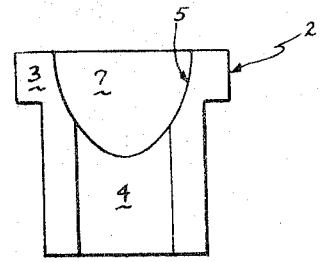
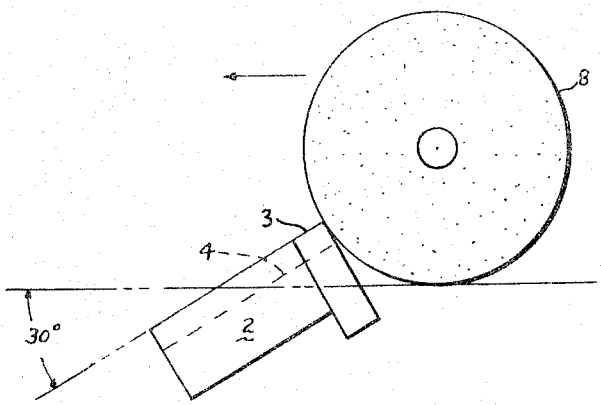
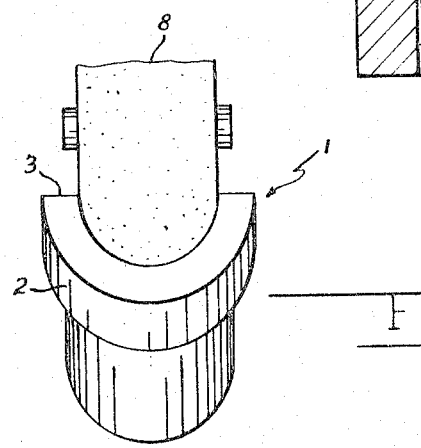
INVENTOR.
ROBERT L. BLEICHER
BY Tom Walker
Jerome P. Bloom
ATTORNEYS United States Patent Office 3,298,085
Patented Jan. 17, 1967

3,298,085
METHOD OF FORMING BUSHINGS
Robert L. Bleicher, Dayton, Ohio, assignor to Dayton Perforators, Inc., Dayton, Ohio, a corporation of Ohio
Original application Dec. 21, 1961, Ser. No. 161,191, now Patent No. 3,155,440, dated Nov. 3, 1964. Divided and this application Nov. 22, 1963, Ser. No. 325,550
9 Claims. (Cl. 29—149.5)

The instant case is a division of applicant's prior copending application filed December 21, 1961 for Split Bushing, now United States Letters Patent 3,155,440, dated November 3, 1964.

This invention relates to a novel method of fabricating guide bushings.

A bushing is a highly essential device having a wide variety of application. When serving as a guide for a reciprocating tool it is generally formed in one piece and expanded at its entrance end to facilitate the entrance and passage of the tool therethrough. This expansion is conventionally effected by a countersinking operation or by employing a conical grinding element in a boring operation. The countersinking operation produces shoulders or ridges in the entrance wall. The shoulders or ridges tend to cause wear or abrupt deflection of the reciprocating tool with obvious undesirable consequences. On the other hand, a conical grinding element is quite expensive in the first instance. Moreover, it wears rapidly and must be dressed frequently. For this reason it is difficult to get uniform or precision results when employing the conical grinding element.

The present invention is significant in that it provides a simplified method of fabricating an improved guide bushing in a manner to eliminate the problems prevalent in making and using prior art bushings as above described. The method eliminates the need for specially formed or expensive grinding tools and provides guide bushings the entrance ends of which, in a preferred form, are provided with parabolically contoured surface portions affording a safe entrance and precision alignment for tools passing therethrough.

A primary object of the invention is to provide improvements in guide bushings and the like and their method of manufacture rendering them economical to fabricate, more efficient and satisfactory in use and adaptable to a wide variety of application.

Another object of the invention is to provide a simplified method of fabricating guide bushings.

An additional object of the invention is to provide a novel method of effecting a generally parabolic expansion of the entrance end of a guide bushing.

A further object of the invention is to provide a method of forming improved guide bushings employing a conventional grinding wheel having a grinding surface which is uniformly arcuate in cross-section, in a sense transverse to the plane thereof.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view of the entrance end of a bushing in accordance with the invention;

FIG. 2 is an elevation view of the device of FIG. 1;

FIG. 3 is a side elevation view illustrating a method of fabricating the improved bushing in accordance with the invention;

FIG. 4 is an end view of the structure shown in FIG. 3; and

FIG. 5 is a view in cross-section taken substantially along the line 5—5 of FIG. 1;

Like parts are indicated by similar characters of reference throughout the several views.

As seen in the drawings, a split guide bushing 1 is provided in assembled form to have an outer periphery which is generally circular in cross-section. The bushing 1 consists of two identical generally hemi-cylindrical segments 2 having abutting planar surfaces 3. Centrally and longitudinally of each surface 3 is a depression 4 which is uniformly rectangular save at its entrance end 5. In the mating of the segments 2 the depressions 4 mate to mutually define a through passage 6 in the bushing 1 which is rectangular in cross-section except at its entrance end. The mating surface portions 7 of the segments 2 at the entrance end of the passage 6 are formed to mutually define a smooth surface which in planes parallel to the surfaces 3 is generally parabolic in configuration and in planes perpendicular thereto is V-shaped in configuration. The net effect is to provide an entrance surface having the general contour of a paraboloid, the apex of which merges uniformly into the rectangularly oriented sides of the segments 2 defining the passage 6.

The guide bushing above described is fabricated in the following manner. Two hemi-cylindrical segments 2 are suitably formed such as by splitting a cylindrical rod. Each segment is then subjected to application of a cutting tool operated to form a uniformly rectangular depression 4 centrally and longitudinally of its surface 3. Each segment 2 is then positioned in a holder, as shown in FIGS. 3 and 4 of the drawings, to dispose its surface 3 at a 30° angle to the horizontal. Then a conventional cutting wheel 8 having a cutting surface that is uniformly arcuate in cross-sectional contour is oriented in a plane perpendicular to the surface 3, in line with its central longitudinal axis. The wheel 8 is large in diameter in relation to the length of cut to be made and is advanced on a direct horizontal line. Intercepting the surface 3, it effects a single nearly straight line cut therein at a 30° angle relative thereto. The length and depth of the cut is determined by the vertical adjustment of the wheel 8 with reference to the surface 3 of the segment 2 and is limited to one end of the surface 3. In this simple fashion an entrance depression is effected in the surface 3 which is of smooth continuous character the contour of which is parabolic in planes parallel to the surface 3 and that of a straight line inclined to the surface 3 in planes at right angles thereto. The approximately straight line cut by this grinding wheel 8, the edge of which is uniformly arcuate in cross-section, thereby produces a depression having the general contour of a section of a paraboloid that merges smoothly into the edges of the rectangular depression 4 without leaving shoulders, ridges or burrs.

Both segments of the blank for the bushing 1 being uniformly cut, their planar surfaces 3 and depressions 4 will accurately mate on their assembly. A guide bushing thus derives, as previously described, having a rectangular through passage 6 the entrance end of which is generally parabolically expanded in a smooth uniform fashion. When applying the bushing so formed to a stripping plate, for example, on advance of a punch or cutting element to move through the bushing the generally paraboloid contour of the major portion of the entrance surface of the passage 6 will gently guide it to its proper alignment to accomplish its desired cutting function.

While the depressions 4 are illustrated as rectangular and the invention improvements particularly definitive when applied thereto, the shape of the depressions obviously need not be so limited. Nor need the angle at which the wheel or grinding element 8 is applied to surface 3 be limited to 30°. However, such angle should preferably not exceed 45°.

The above method of the invention involves the use of simple and conventional equipment, thereby enabling a substantial reduction of bushing cost.

The equipment required by the present invention is in direct contrast to expensive conical grinding elements or unsatisfactory counter-sinking devices such as previously employed. Moreover, the prior art methods of producing guide bushings are generally incapable of providing parabolic contour to their entrance surfaces. This is particularly significant since the production of a bushing with entrance surface portions of a generally parabolic contour enables economy in its fabrication and optimum efficiency and minimum maintenance problems in use.

It must thus be evident that the invention not only provides substantial economies in the art of producing bushings but affords improvements of considerable significance in the end products.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A method of forming a guide bushing including the steps of forming mating blanks and, with reference to each blank, cutting a depression in one surface thereof, setting a grinding wheel the peripheral surface of which has a uniformly arcuate cross-sectional contour so said peripheral grinding surface is established to operate in one plane inclined to the plane of said one surface, in line with the depression therein, and inducing relative straight line movement between said wheel and blank to effect an interengagement thereof and smooth uniform expansion of the depression to one end of said blank.

2. A method of forming a guide bushing segment including the steps of forming a segment blank, cutting a depression longitudinally of one surface thereof and expanding said depression in a parabolic contour to one end by applying thereto a grinding surface having a uniformly arcuate cross-section.

3. A method of forming a guide bushing including the steps of forming mating blanks, and, with reference to each blank, cutting a depression along one surface thereof, establishing a grinding element, a surface portion of which has a uniformly arcuate contour, and the blank so the said surface portion of said element is oriented to operate in a plane inclined to the plane of said one surface of said blank, in line with the depression therein, and inducing relative straight line movement between said grinding element and said blank to effect an arcuate expansion of the depression to at least one end thereof.

4. A method of fabricating a guide bushing including the steps of forming a bushing blank in equal segments, forming a groove in one surface of each segment to enable the segments to mutually define a through passage by means of said one surface on assembly thereof, establishing each segment with said one surface inclined to a predetermined plane and moving a cutting element in said plane to have a surface portion thereof which is uniformly arcuate in cross-section intercept said one surface and expand one end of the groove to a generally arcuate contour with a single cut.

5. The method as set forth in claim 4 wherein the cutting element is applied in a manner to cause the groove to assume a parabolic contour in planes parallel to said one surface.

6. A method of fabricating a guide bushing including the steps of forming a bushing blank in segments and taking each such segment and individually cutting a longitudinal depression in one surface thereof having a contour generally rectangular in cross-section, and cutting a generally parabolic expansion of the depression to one end by applying a cutting surface having a uniformly arcuate cross-sectional contour.

7. A method of forming a guide bushing including the steps of forming a shell in segments, cutting a groove in one surface of each segment, inducing a relative inclination of each segment to a horizontal and moving a grinding wheel the peripheral surface of which is uniformly arcuate in cross-section in said horizontal to intercept said one surface and effect an expansion of the groove therein which is parabolic in a transverse sense.

8. The method as set forth in claim 7 wherein the parabolic expansion is effected to only one end of said groove.

9. A method of forming a guide bushing including the steps of forming mating blanks and, with reference to each blank, cutting a rectangular depression longitudinally of one surface thereof, setting a grinding wheel so its grinding surface having a symmetrical cross-sectional contour is established to operate in a plane inclined to the plane of said one surface, substantially in line with a depression therein, and inducing a relative movement between said wheel and blank to effect an inter-engagement thereof and a smooth uniform expansion of the depression to one end of said blank.

References Cited by the Examiner

UNITED STATES PATENTS 973,191 10/1910 Hardinge _____ 29—558 X

FOREIGN PATENTS 451,729 8/1936 Great Britain.

CHARLIE T. MOON, *Primary Examiner.*